June 16, 1931.  G. H. MAINS  1,809,984
SURFACE FINISHING FOR MOLDED ARTICLES
Filed Nov. 28, 1925
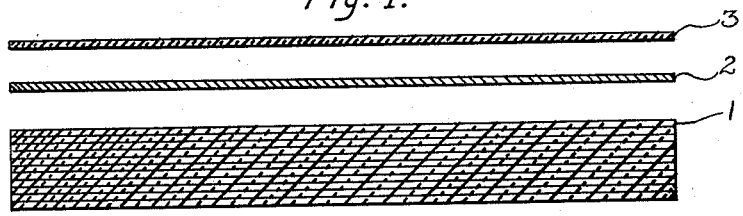
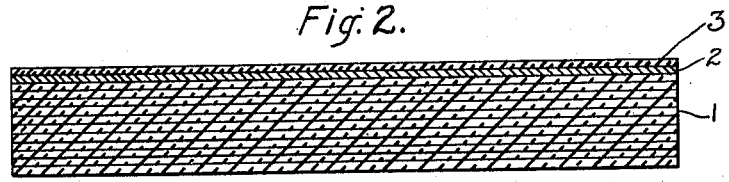
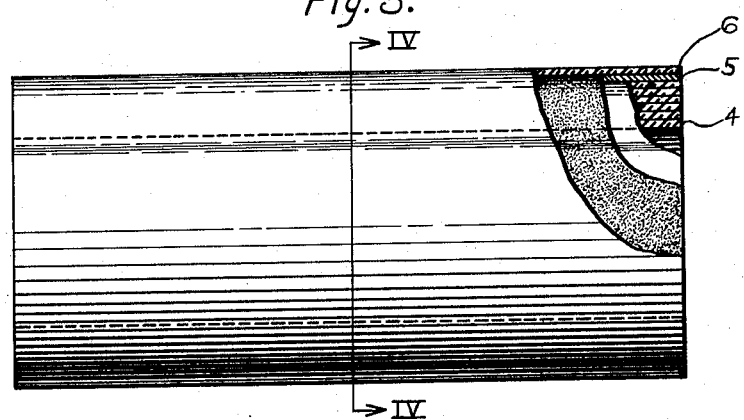
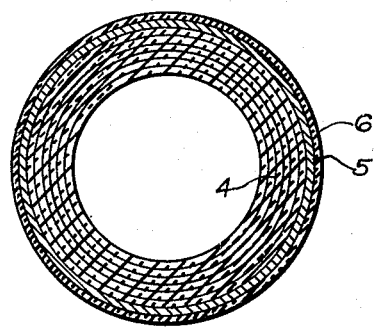
WITNESSES:
R. S. Williams
W. B. Jaspert
INVENTOR
Gerald H. Mains
BY
Wesley G. Carr
ATTORNEY Patented June 16, 1931

1,809,984

UNITED STATES PATENT OFFICE

GERALD H. MAINS, OF WILKINSBURG, PENNSYLVANIA, ASSIGNOR TO WESTINGHOUSE ELECTRIC & MANUFACTURING COMPANY, A CORPORATION OF PENNSYLVANIA

SURFACE FINISHING FOR MOLDED ARTICLES

Application filed November 28, 1925. Serial No. 71,941.

My invention relates to composite materials and more particularly to a method for providing surface finishes for molded articles.

It is among the objects of my invention to provide a highly polished and lustrous finish for molded articles, which shall be applied during the usual process of molding by which such articles are produced and which shall not materially increase the cost of manufacturing such articles.

Another object of my invention is to provide a surface finish for molded articles which shall be decorative and adapted to produce color effects in the appearance of the articles so formed.

It has been heretofore proposed to provide surface finishes for molded articles by utilizing surfacing materials that are peculiarly adapted to form highly polished surfaces when molded under heat and pressure, and by inserting designs or colored material between the surface layer and the main body portion of such articles for the purpose of providing decorative effects.

The latter method of utilizing inserts is quite successful on account of the effectiveness of bringing out the designs through a translucent surface sheet by which they are protected and which is molded directly thereon. The sheet material upon which the design is printed, stamped or otherwise produced is of a fibrous composition to permit the binder with which it is secured to the surface layer and adjacent body layer to permeate the pores to unite the materials.

My present invention utilizes either surface sheets or insert sheets of metal foil, metallic papers, or papers which have metals or metallic salts precipitated or deposited in them which are applied to the molded article during the molding process either by treating the sheet of foil or paper with a binder or by inserting the same between layers previously coated or impregnated with such a binding agent. The foil or metal is impervious to the binding material and therefore retains its lustrous finish, which constitutes the surface of the molded article when metallic sheet material is used as the surfacing material, and it also has a lustrous appearance where a surface sheet of japan or other translucent sheet material is utilized in connection therewith.

In the accompanying drawings constituting a part hereof and in which like reference characters designate like parts:

Figure 1 is an exploded view of a composite article before molding, embodying the principles of my invention, Fig. 2 is a sectional view thereof after the molding operation, Fig. 3 is a view in side elevation, partially in section, illustrating the application of my invention to tubular structures, and Fig. 4 is a cross-sectional view of the article shown in Fig. 3, taken along the line IV—IV thereof.

Referring to Fig. 1, the article therein illustrated comprises a main body portion of molded composition or laminated sheet material 1, which has been treated with a potentially infusible binding agent, such as the well-known phenolic condensation products, a sheet of suitable metallic material 2 and a surface sheet of translucent material 3. The material 2 may be coated on both sides with the binding agent that is utilized in the material constituting the body portion 1, and the surface sheet material 3 may be treated in a similar manner.

The body material, metallic material and surface sheets 1, 2 and 3 respectively, are then superposed and inserted between a pair of heatable platens of a hydraulic press and are subjected to heat and pressure simultaneously, to fuse and harden the binder in accordance with a well-known practice, thus consolidating the assembled layers into a solid integral mass. The surface sheets 3, under which the metallic material is disposed, has a bright lustrous appearance that is highly ornamental, and the sheet 2 is useful as a conductor shield when the article formed as outlined above is utilized for panel purposes, such as for radio panels and the like.

Referring to Figs. 3 and 4, illustrating the tube construction, the process employed is similar to that pertaining to the molding of the plate stock illustrated in Figs. 1 and 2. The tube is formed by spirally winding a sheet of fibrous insulating material 4, which has been previously treated with a binding material, upon a mandrel, a sufficient number of turns being utilized to provide a wall section of predetermined thickness. A layer of metallic sheet material 5 is wound on the tube, and a surface sheet or outer envelope 6 of translucent sheet material, such as japan paper treated with a binding agent, is then applied.

The winding operations taking place between a pair of heated pressure rolls, the resultant product will be a solid integral structure having a lustrous finished outer surface similar to the finish produced on the member illustrated in Fig. 2.

It is evident from the foregoing description of my invention that molded articles may thereby be provided with a highly polished decorative surface that is desirable for various commercial applications.

Although I have described a specific embodiment of my invention, it will be obvious to those skilled in the art that various modifications may be made in the steps of my process and in the application of the articles formed thereby without departing from the principles herein set forth.

I claim as my invention:—

1. A method of providing a surface finish for molded articles which comprises assembling a plurality of layers of fibrous sheet material impregnated with a potentially infusible binder in a mold, placing a layer of metal foil coated with a binder on said assembled layers and subjecting said layers to heat and pressure to render the binder infusible and to form an integral hardened mass.

2. A method of providing a surface finish for molded articles which comprises assembling a plurality of layers of fibrous sheet material impregnated with a binder capable of being hardened under the influence of heat and pressure in a mold, placing a layer of metallic sheet material coated with a binder on said assembled layers, disposing a surface layer of translucent material on said metallic material and subjecting said layers to heat and pressure to form an integral hardened mass.

3. A method of providing a surface finish for molded articles which comprises assembling a composition including a plurality of layers of sheet material impregnated with a potentially infusible binder in a mold, placing a layer of metal foil coated with a similar binder on said composition, disposing a surface sheet of translucent material on said foil and subjecting said assembled materials to heat and pressure to render the binder infusible and to form an integral hardened mass.

4. A method of providing a surface finish for molded articles which comprises forming a plurality of superposed spirally wound convolutions of fibrous sheet material impregnated with a potentially infusible binder on a mandrel, winding a layer of metallic sheet material thereon, disposing a surface layer of translucent material on said foil and rolling the layers so wound between heated pressure rolls to render the binder infusible and compact and consolidate the same to form a hardened integral mass.

5. A composite article, comprising a body portion composed of a plurality of sheets of fibrous material consolidated with a heat hardened binder, having a finishing layer of metallic sheet material and a protecting layer of translucent material joined integrally therewith.

6. A composite article, comprising a tubular body portion composed of a plurality of sheets of fibrous material consolidated with a heat hardened binder, having a surface layer of metallic sheet material joined integrally therewith.

7. A composite article, comprising a tubular body portion composed of a plurality of sheets of fibrous material consolidated with a heat hardened binder having a finishing layer of metallic sheet material and a protecting layer of translucent material joined integrally therewith.

8. A method of providing a surface finish for molded articles which comprises treating layers of fibrous sheet material with a binder, at least one of said layers being translucent, and inserting a layer of material which is impervious to the binder between the translucent layer and an adjacent layer and subjecting the assembled layers to heat and pressure to consolidate the same.

9. A method of providing a surface finish for molded articles which comprises impregnating layers of fibrous sheet material, at least one of which is translucent, with a potentially infusible binder, inserting a decorative layer of material which is impervious to the binder between the translucent layer and an adjacent layer, and subjecting the assembled layers to heat and pressure to render the binder infusible and to consolidate the sheets into a composite body.

10. A method of providing a surface finish for molded articles which comprises impregnating layers of fibrous sheet material, at least one layer of which is translucent, with a potentially infusible binder, inserting a layer of a metallic material between the translucent layer and an adjacent layer and subjecting the assembled layers to heat and pressure to render the binder infusible and to consolidate the sheets into a composite body.

11. A composite molded article comprising a body portion composed of a plurality of layers of fibrous material and an outer layer of metal, the layers of fibrous material being impregnated with, and united to each other and to the metal layer into a composite unitary structure by means of, an infusible, heat-hardened binder.

12. A composite molded article comprising a body portion composed of a plurality of layers of fibrous material and an outer layer of metal, the layers of fibrous material being impregnated with, and united to each other and to the layer of metal by means of, an infusible phenolic condensation product.

In testimony whereof, I have hereunto subscribed my name this 21st day of November, 1925.

GERALD H. MAINS.